United States Patent [19]
Morris

[11] 3,822,503
[45] July 9, 1974

[54] MODEL AIRPLANE TIMING MECHANISM

[76] Inventor: Wesley F. Morris, 7422 E. MacKinley, Scottsdale, Ariz. 85257

[22] Filed: May 25, 1972

[21] Appl. No.: 257,037

[52] U.S. Cl. ............... 46/244 B, 46/76, 46/243 AV
[51] Int. Cl. .......................................... A63h 27/02
[58] Field of Search ............ 46/76, 243 AV, 244 B

[56] References Cited
UNITED STATES PATENTS
2,858,386  10/1958  Bonner ............................ 46/76 R
3,400,488  9/1968  Phillpott et al. .................. 46/244 B Primary Examiner—Antonio F. Guida
Assistant Examiner—Robert F. Cutting
Attorney, Agent, or Firm—Cahill, Sutton & Thomas

[57] ABSTRACT

A free flight model airplane incorporating a timer for selectively energizing acutating mechanisms controlling the flight path of the airplane is disclosed. The timer includes a source for generating a train of pulses and a plurality of counters responsive to the train of pulses. One or more gates, selectively responsive to the output signals of one or more of the counters, energizes a mechanical actuator at selected time intervals, which mechanical actuator in turn alters the flight mode of the free flight model airplane. Provisions are also available to interrupt the timed sequence on command to effect immediate alteration of the flight mode.

8 Claims, 3 Drawing Figures

MODEL AIRPLANE TIMING MECHANISM

The present invention relates to timed model airplane actuators, and more particularly, to electronic timing circuits having a plurality of differently timed outputs energizing actuating mechanisms, which mechanisms serially affect the flight path of model airplanes.

In the field of model airplanes, there are many types of model airplanes. Each different type if specifically designed to accomplish a specified flight pattern and flight duration. One of the most widely built and competitively flown types of model airplanes is that type known as a "free flight" model airplane. In essence, this type of model airplane is an ultra-high performance model airplane designed to fly under power for a brief duration and then glide for a maximum period of time.

The aerodynamic characteristics desired while the free flight model airplane is under power are quite different from those desired after the power or engine stops. Consequently, the design of the free flight model is a unique blend of design criteria optimized for each phase of flight.

In model airplane free flight competitions, the object of the competition is to have the model climb under power as steeply as possible while the engine is running. After the engine stops, the model flys as a glider with the minimum possible sink rate. The glide time should be of a duration equal to or greater than the maximum specified time (five to ten minutes per flight, depending upon model size and type of contest) for a maximum score. Each flight constitutes a round in the competition. The flight times of the number of rounds flown are then totalled and the model having the largest total wins.

The permissible engine run time is variable (five to twenty seconds), depending upon the size or class of model and the type of competition. If the engine run time is longer than specified, the contestant is disqualified from that round. If the engine run time is less than specified, the contestant is not disqualified. However, if the engine run is not at or near the optimum permissible time, the contestant is at a disadvantage in that the model has not climbed as high as possible. This, of course, affects the total height attained and the duration of the glide. For this reason, it is extremely important that the timing mechanism used to time the engine run be accurate, and under no circumstances permits the engine to run longer than the specified time.

In competition, no additional competitive advantage is achieved by having the glide time extend beyond the maximum specified period. It is therefore desirable to have the glider return to the ground as soon as possible after the glide has achieved the maximum flight duration. This not only provides a time-saving feature but will prevent the glider from flying out of sight.

On some occasions, a free flight model is subjected to an atmospheric phenomenon known as a "thermal." A thermal is a rising bubble or column of air. If the free flight model were to fly into a thermal, it will invariably rise with the thermal for many hundreds, and in some cases, many thousands of feet. During most competitions, the contestants welcome the presence of thermals and attempt to launch their model airplanes into the thermals. The thermal then provides a distinct competitive advantage in achieving the maximum specified time. However, the model airplane must incorporate some device or apparatus to fly out of the thermal; otherwise, there is a distinct possibility that the model will fly out of sight and be lost.

A standard method for "de-thermalizing" free flight models is that of having the horizontal stabilizer rotate upwardly about its leading edge through an angle of approximately 60°. The rotated stabilizer destroys the glide capability of the model and causes it to sink in a near vertical path. The altered flight characteristics prevents the model from diving and causes it to sink with its fuselage essentially parallel to the ground. Thus, the model suffers little, if any, damage on landing.

In the past, several different devices have been used to limit both the engine run and to de-thermalize the free flight model. One of the most common engine timing devices used is that of a lit fuse having a predetermined burn rate and operating in conjunction with the fuel supply for the engine. After burning for a specified time, the fuse burns through a rubber band. The broken rubber band generally releases some type of mechanism which either cuts off the fueld flow to the engine or provides an increased fueld flow to floor the engine. In either case, the engine stops.

There is a major problem associated with using a fuse. Fuses, that is those generally available and reasonably priced, do not have absolutely constant burn rates. It is therefore necessary for the modeler to set the fuse for a shorter burn period than that permissible to compensate for the variable burn period. If the fuse stops the engine prior to the permissible engine run time period, the model will not attain the maximum possible height and the model is at a competitive disadvantage. If the engine is not stopped within the engine run time period, the flight is disqualified.

Another more sophisticated engine timing device is a clockwork device such as shown in United States Letters Patent No. 3,074,204, issued to J. Tatone. The clockwork mechanism is fairly accurate and will provide a fairly well controlled engine run. However, the clockwork mechanism suffers from a major defect. While the engine is running, the whole model is subjected to considerable vibration. The vibration invariably affects the engine timer and alters its accuracy. Therefore, even though clockwork timers are used, they must be set for a time period less than that permissible to insure that there will not be an engine overrun. Again, the modeler is at a competitive disadvantage.

The de-thermalizing operation of the free flight model has usually been accomplished either by a burning fuse or by a clockwork timer tripping the horizontal stabilizer. When using a fuse for the de-thermalizing operation, it is not unusual for the fuse not to be properly lit, to stop burning, or to fall off the model. Should any of these conditions occur, the model will, of course, not be de-thermalized, resulting in a possible loss of the model. The lit fuse can also present a fire hazard in that when the model lands, the fuse may still be burning and set fire to the grass or shrubbery. When a clockwork timer is used, the clockwork mechanism may be deleteriously affected by the engine vibrations, reducing its accuracy. In addition, the weight of a second clockwork timer may be sufficient to affect the performance of the free flight model.

In some cases, a single clockwork timer has been used to time both the engine run and the de-thermalizing operation. A timer of this nature, having to run for a period of up to ten minutes suffers from a major problem. It must be extremely accurate for the first five to fifteen seconds and it is difficult and expensive to build a timer having a ten minute time span with the requisite accuracy for the engine run. This type of timer is also subjected to the deleterious effects of the attendant engine vibrations.

It is therefore a primary purpose of the present invention to provide a dual function timing mechanism for model airplanes.

Another object of the present invention is to provide an actuator operable upon the lapse of a specified time period.

Yet another object of the present invention is to provide a timing mechanism for serially energizing actuators.

Still another object of the present invention is to provide a feedback signal from a first actuator to gate the operation of a second actuator.

A further object of the present invention is to provide an override to disconnect the timing sequence and energize an actuator on command.

A yet further object of the present invention is to provide a plurality of serially selectable time periods for energizing an actuator.

A still further object of the present invention is to provide a means for limiting the engine run and de-thermalizing a model airplane.

These and other objects of the present invention will become apparent to those skilled in the art as the description thereof proceeds.

The present invention may be understood with greater clarity and specificity with reference to the following drawings, in which.

Free flight model airplanes use an engine to climb and attain the greatest possible height during a given time period. At the completion of the time period, the engine is stopped and the model begins to fly as a glide. The duration of the glide is a function of the height attained during the engine run, the design of the model and atmospheric conditions. In free flight model airplane contests, the object of the contests is to obtain the greatest total flight time. There may be several rounds with the winning model having the greatest total time for all of the rounds. In each round, a time limitation is placed on the engine run time (in terms of seconds). If the engine run time is exceeded, disqualification results. The total flight time (engine run time plus gliding time) per round which can be earned is limited to a maximum time (in terms of minutes) and is referred to as a "max." There is no point in permitting the free flight model to continue to glide beyond the time of a "max" as no additional score can be earned. In addition, there is a greater danger of having the model fly out of sight if the flight is not purposely terminated.

Figure 1:
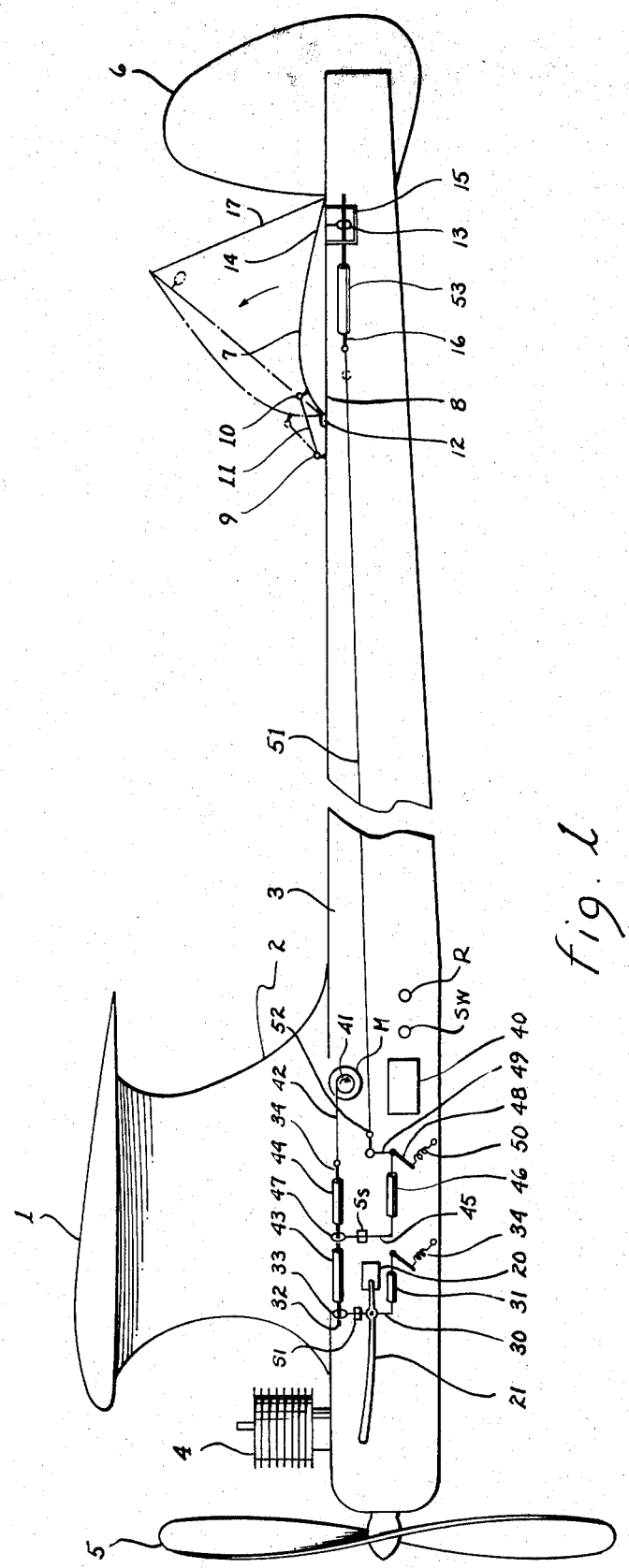
FIG. 1 illustrates the present invention.

Referring to FIG. 1, there is shown a representative free flight model airplane incorporating the present invention. The wing 1 is mounted upon a pylon 2 extending from the fuselage 3. A one-cylinder, two-cycle engine 4 is mounted at the nose of the fuselage 3 to rotate a propeller 5 and provide the motive means for the model airplane.

The engine run time period may be limited by any one of three basic methods. First, the fuel supply can be limited. Second, the fuel supply can be cut off after a specified time. Third, an excess fuel supply can be forced into the engine to flood it.

The first method is rarely used as it is almost impossible to correctly estimate the amount of fuel necessary to start and tune the engine. Thus, substantial variation in engine run time can occur. The second method can damage the engine through lean running and momentary excessive engine speed. The third method is the most commonly used method.

In FIG. 1 there is shown a representative arrangement for flooding a model airplane engine. A fuel tank 20 is pressurized to provide fuel output under pressure. A fuel line 21 connects tank 20 to the engine 4. The fuel line 21 is generally of flexible material, such as soft rubber, to permit the squeezing of the fuel line to inhibit fuel flow therethrough. In the figure, a lever 30, pivotally secured to the fuselage 3 by a piece of tubing 31, is retained against the fuselage by the end 32 of a pin 34 engaging an eyelet 33 at the end of the lever. The fuel line 21 is disposed adjacent the fuselage 3 and squeezed by the lever 30 to inhibit fuel flow therethrough. When the end of pin 32 is disengaged from eyelet 33, lever 30 rotates and no longer constricts fuel flow through the fuel line 21 and fuel flows to the engine 4 to stop it by flooding it. As discussed above, other methods which augment or inhibit the flow of fuel may be used to stop the engine.

The empennage is mounted at the rear of the fuselage 3 and includes a vertical stabilizer, or rudder 6, and a horizontal stabilizer 7. There are many variations for mounting the empennage and the design shown is intended only as a representation of a basic mounting.

To de-thermalize the model, the horizontal stabilizer 7 is generally pivotable about its leading edge 8. This may be accomplished in the following manner. A hook 9 is attached to the fuselage 3 forward of the leading edge 8. A second hook 10 is secured to the top of the horizontal stabilizer 7. A rubber band 11 is wrapped about the two hooks and tends to draw the horizontal stabilizer forward. A stop 12 is secured to the fuselage 3 in front of the leading edge 8. Consequently, the force exerted by the rubber band 11 tends to pivot the horizontal stabilizer 7 in the forward direction about the leading edge 8.

In normal flight, the horizontal stabilizer 7 must be secured to the fuselage 3 and not be permitted to rotate. There are several means for retaining the horizontal stabilizer 7 on the fuselage 3 and only a representative release mechanism is shown which permits pivoting of the horizontal stabilizer 7 on command. An eyelet 13 is secured to the trailing edge 14 of the vertical stabilizer 7 and extends downwardly therefrom. The eyelet 13 fits within a channel 15 secured to the fuselage 3. A pin 16 engages apertures (not shown) within the channel 15 and the eyelet 13 to secure the eyelet within the channel. When pin 16 is withdrawn from channel 15, the eyelet 13 is released and the horizontal stabilizer is free to rotate in response to the force of the rubber band 11. The extent of rotation is usually about 60° and is limited by a line 17 secured to the trailing edge 14 and the fuselage 3.

The timing circuit and actuating mechanism as shown in FIG. 1 will now be described. The timing circuit, which may be built from discrete components, integrated circuits or of a hybrid type, is shown as a module 40. An on/off switch Sw, energizing module 40, is mounted on the side of fuselage 3. A reset switch R for resetting the timing circuit is also mounted on the fuselage 3. A miniature dc motor M is selectively energized by the timing circuit. A pulley 41 is attached to the armature of motor M, which pulley, on command, rotates to wind line 42 thereabout. Line 42 is attached to a pin 34 journaled within two separated axially aligned sleeves 43 and 44.

The end 32 of pin 34 engages the eyelet 33 of lever 30, as discussed above. Lever 30 not only squeezes fuel line 21 but depresses the button of a switch S1, closing the switch. Switch S1 connects the timing circuit within module 40 to motor M. At the completion of the specified engine run time period (as will be described in more detail below), the motor M is energized and pulley 41 will rotate drawing pin 34 toward the pulley. When the end 32 of pin 43 cleans the eyelet 33 of lever 30, lever 30, urged by a spring 34 secured between a leg 35 of lever 30 and fuselage 3, pivots away from the side of the fuselage. The previously discussed squeezed fuel line 21 is released flooding the engine and stopping it. Simultaneously, the button of switch S1 is released causing the circuit between timing circuit and motor M to open. The opened circuit removes the power from motor M causing the pulley 41 to stop rotating and halting the further movement of pin 43. The operation of switch S1 does not affect the time count of the timing circuit and the operation of the latter continues.

A second lever 45, pivotally secured to the side of fuselage 3 by a piece of tubing 46, is retained against the fuselage by pin 43 engaging an eyelet 47 at the end of the lever. Lever 45, when adjacent the fuselage 3, depresses the button of a switch Ss, closing the switch. Switch Ss connects the motor M to its power supply.

On termination of the de-thermalizing time period, motor M is again energized. The motor armature and attached pulley 41 will again rotate and further withdraw pin 34 from within sleeves 43 and 44. When the eyelet 47 of lever 45 is no longer retained by pin 32, the lever will pivot away from the side of the fuselage 3 releasing the button of switch Ss. On release of the button, the motor M is disconnected from the power supply causing the motor armature and pulley 41 to stop rotating. The movement of pin 43 also stops and the pin will remain positioned within sleeve 44.

Lever 45 includes a pair of arms 48 and 49 extending from the pivot point. A spring 50 is secured between arm 48 and the side of fuselage 3 to provide a force urging lever 45 to rotate away from the side of the fuselage. A line 51 is secured to the end of arm 49. The line extends from arm 49, through an eyelet 52 secured to the fuselage 3 and to pin 16, the latter being retained within tubing 53 secured to the side of the fuselage 3. Pivotal movement of lever 45, as described above, causes arm 49 to withdraw pin 16 from within the apertures of channel 15 and eyelet 13 by pulling line 51. Thus, on release of lever 45 the motor M stops rotating and the horizontal stabilizer 7 is freed to rotate upwardly and de-thermalize the free flight model airplane.

In conclusion, at the completion of a first time period, the engine 4 is shut off by energization of mechanical actuators. Simultaneously, further movement of the mechanical actuators is halted and the timing circuit is reconnected to permit future actuation of the second phase of operation. At the completion of a second time period, further mechanical actuators are energized to de-thermalize the free flight model. Simultaneously, further movement of the mechanical actuators is halted.

Figure 2:
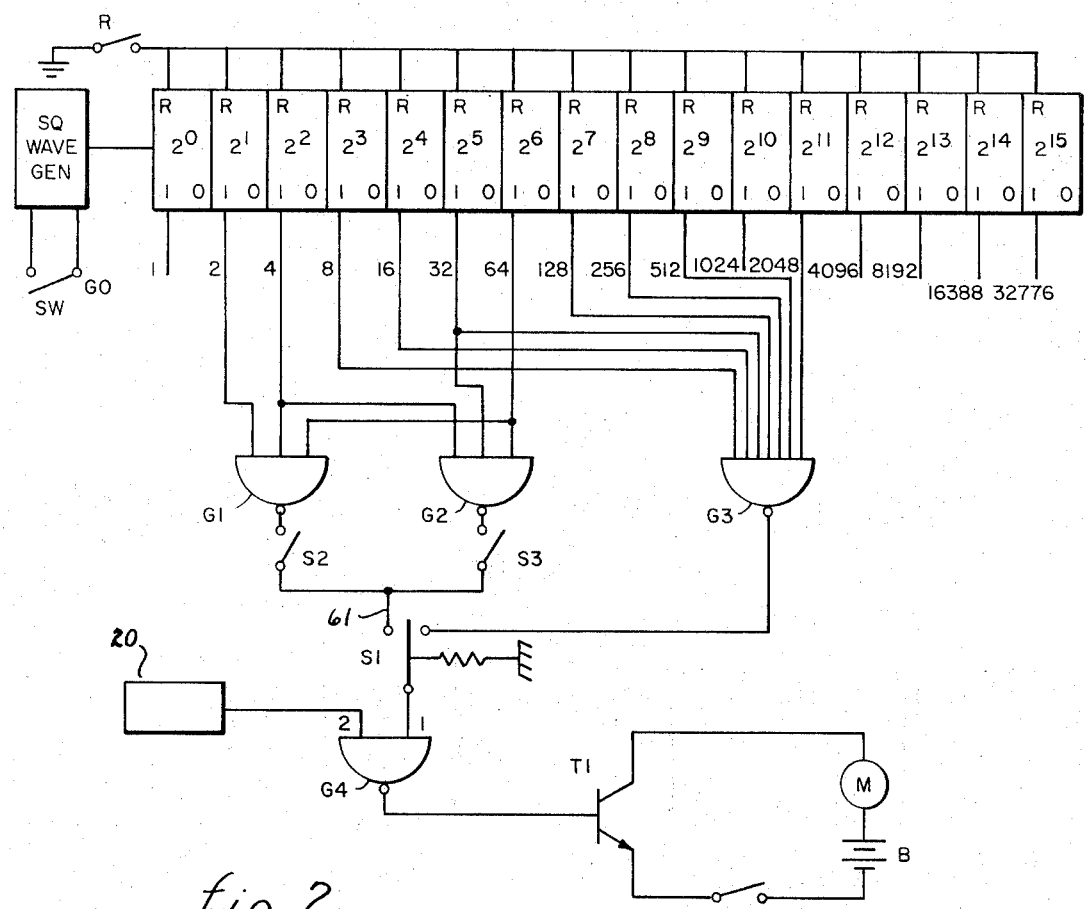
FIG. 2 is a schematic of the timing and decoding circuit of the present invention.

Referring now to FIG. 2, there is shown the electronic timing circuitry complementary to the above-described actuating mechanism. A square wave generator 60, energized by on/off switch Sw generates a continuous train of pulses to a first counter of a plurality of serially connected counters. The counters, or commonly called flip-flops, are identified as $2^0, 2^1, 2^2, 2^3, 2^4, 2^5, 2^6, 2^7, 2^8, 2^9, 2^{10}, 2^{11}, 2^{12}, 2^{13}, 2^{14}$ and $2^{15}$. Each of the counters $2^0 - 2^{15}$ has a high (1) and a low (0) output. A common reset switch R is employed for each of the counters to reset all of the counters to zero and initiate the counting operation.

In the present invention, only the high output of each of the counters is employed. However, it is to be understood that the low outputs may also be employed provided that appropriate changes to the to-be-described decoding system are employed. In FIG. 2, the high output (1) of each of the counters is also identified by a numeral equivalent in number to the number of output pulses generated by the square wave generator 60 required to obtain an output from the respective counter.

The period of the output pulses from the square wave generator may be of any suitable duration. For the sake of simplicity and degree of accuracy necessary in the present invention, a period of 0.1 seconds is suitable. Thus, a counter, such as counter $2^7$ would provide an output pulse every 12.8 seconds.

A plurality of gates, such as gates G1, G2 and G3 are each connected to different high outputs of some of the counters $2^0 - 2^{15}$. Each of the gates G1, G2 and G3 are NAND gates, each of which provides a high output unless all gate inputs are high. If the latter is true, the NAND gate output is low. Therefore, all of the counters connected to any one gate must provide a high output to obtain a low output from the gate.

In the preferred embodiment, gates G1 and G2 are alternately selectable through one of switches S2 or S3. These gates have their inputs selected to provide an output corresponding with one of two often used time periods for the engine run, i.e., 7 seconds and 10 seconds. To obtain these time periods, the inputs to gate G1 are connected to the outputs of counters $2^1, 2^2$ and $2^6$ and the inputs to gate G2 are connected to the outputs of counters $2^2, 2^5$, and $2^6$. After the selected time period has occurred, depending on which gate was connected in the circuit, all the inputs to the respective gate will be high. The respective gate is thereby enabled and provides a low output on line 61 through switch 53 (shown in its first state) and to input 1 of gate G4. Gate G4 is also a NAND gate, providing a high output if less than all of the inputs are low.

The second input to input 2 of gate G4 is provided by a timing interruption device 20. Device 20 provides a means for interrupting the timing sequence of the present invention. It may be a small receiver carried by the model airplane and responsive to a transmitter or it may be a manually actuated device. In operation, device 20 provides a high output in the quiescent condition and a low output when actuated.

The operation of gate G4 may be described as follows. While the plurality of counters $2^0 - 2^{15}$ are counting prior to the elapsed time period associated with either of gates G1 or G2, depending upon which gate is connected in the circuit, the output of the respective gate will be high. The high input to input 1 of gate G4 in combination with the high input to input 2 of gate G4 from device 20 enables gate G4 to provide a low output. When the selected time period for either gate G1 or G2 has elapsed, the respective gate will be enabled and provides a low input to input 1 of gate G4. The low input on input 1 in combination with the high input on input 2 partially enables gate G4 to provide a high output therefrom. Similarly, if device 20 is actuated, the input to input 2 of gate G4 will switch from a high to a low. The low input on input 2 in combination with the high input on input 1 partially enables gate G4 to provide a high output therefrom.

The output of gate G4 is connected to the base electrode of a NPN transistor T1. The collector electrode of transistor T1 is connected to one pole of dc motor M. The emitter electrode of transistor T1 is connected to the other pole of motor M through a supplemental switch Ss and a battery B. The purpose of switch Ss is that of disconnecting the motor M from the circuit. Battery B provides the electrical power for the motor M.

A high output from gate G4 provides a positive input to the base electrode of transistor T1 causing the latter to conduct, provided that switch Ss is closed. When transistor T1 conducts, current is applied to motor M and the armature of the latter will rotate.

As discussed above, rotation of the armature of motor M causes the pulley 41 connected thereto to rotate. Rotation of the pulley 41 will wind line 42 thereon and withdraw pin 32 from eyelet 33 and release lever 30. Release of lever 30 permits the spring biased button of subminiature switch S1 to extend switching switch S1 to its second state.

In the second state of switch S1, the outputs of gates G1 and/or G2 are disconnected from the input 1 of gate G4 and the output of gate G3 is connected to input 1 of gate G4. Gate G3 is a NAND gate connected to several of the counters $2 - 2^{12}$. It is enabled to provide a low output after the lapse of several minutes subsequent to depressing the reset switch R. After S1 has switched to its second state, the input to input 1 of gate G4 is high as the connected output of gate G3 is high. The high input on input 1 in combination with the high input on input 2 from device 20 partially enables gate G4. The output of the partially enabled gate G4 now reverts to a low output and turns off transistor T1. When transistor T1 no longer conducts, motor M is unenergized and the armature and pulley 41 will no longer rotate. Thus, movement of pin 32 ceases.

In the embodiment shown, gate G3 is connected to the high outputs of counters $2^3, 2^4, 2^5, 2^7, 2^8, 2^9$, and $2^{10}$ to enable the gate and provide an output after the lapse of a five minute time period. The low output from gate G3 on completion of the five minute time period is applied to input 1 of gate G4. As discussed above, the output of device 20 is high, unless actuated. The combination of both a low and high input to gate G3 enables gate G4 and provides a high input to the base electrode of transistor T1, causing the transistor to conduct (assuming switch Ss is closed).

As transistor T1 conducts, motor M is energized and its armature rotates. Rotation of the armature rotates the pulley 41 and winds line 42 thereon, further withdrawing pin 32 from within sleeve 43 until the pin clears the sleeve. When pin 32 clears sleeve 43, lever 45 is released and the button of switch Ss is released. Release of the button of switch Ss opens the switch and disconnects motor M from the battery B. Without power, the armature motor M ceases to rotate and the attached pulley 41 will no longer wind line 42 nor further withdraw the pin 32 from sleeve 44. The pin 32 will remain within sleeve 44 to prevent its loss or interference with the operation of the model airplane.

Figure 3:
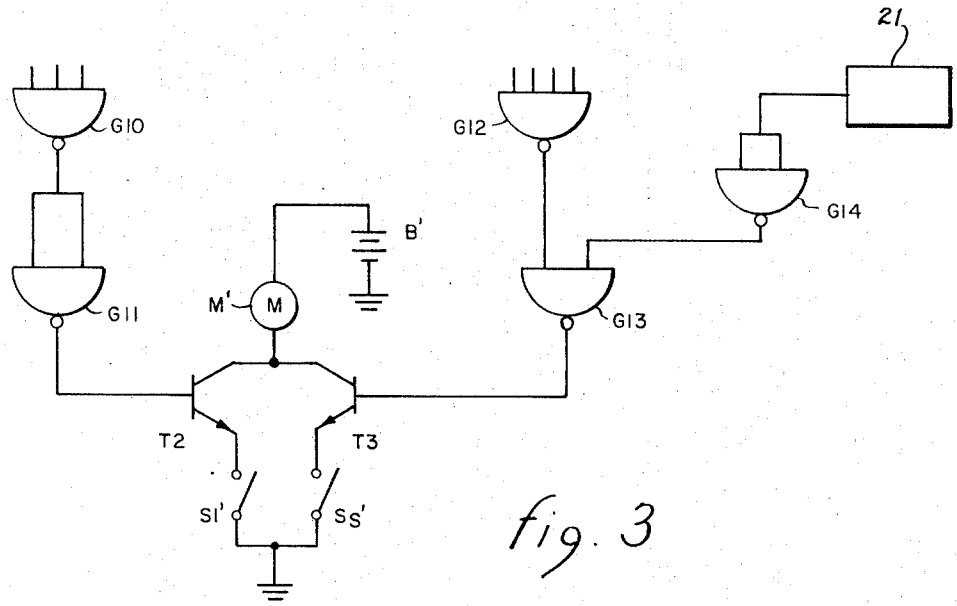
FIG. 3 is a schematic of a modification of the decoding circuit of the present invention.

Referring to FIG. 3, there is shown a modification of the gating and energization circuitry of the present invention. Gate G10, a NAND gate, receives one or more inputs from a corresponding number of selected counters $2^0 - 2^{15}$, which inputs are representative of the time period for the desired engine run time. The output of gate G10 is connected to each of the inputs of gate G11, a NAND gate. Prior to completion of the engine run time, the output of gate G10 will be high. A high input to gate G11 enables gate G11 and the output therefrom will be low. On completion of the engine run time, all inputs to gate G10 will be high, enabling gate G10 and the output therefrom will be low. The low inputs to gate G11 will not enable gate G11 and the output therefrom will be high.

The output of gate G11 is connected to the base electrode of a transistor T2. The emitter electrode of transistor T2 is connected to ground through a switch S1' (which switch corresponds in function to switch S1 shown in FIG. 1 but disconnecting the engine timing circuitry from the actuating mechanism). The collector electrode of transistor T2 is connected to one pole of a d.c. motor M'. The other pole of motor M' is connected to ground through a battery B'.

A low output from gate G11, such as would occur prior to completion of the engine run time, maintains transistor T2 in a non-conducting state. A high output from gate G11, as would occur on completion of the engine run time, will cause transistor T2 to conduct and provide a current path through the motor M' to energize the motor. The energized motor M' will withdraw the pin 34 from eyelet 33 of lever 30 as previously discussed. When lever 30 is freed, the button of switch S1' is released and the switch opens. The open switch S1' disrupts the current path of motor M' and the latter will cease to rotate.

Gate 12, a NAND gate, receives one or more inputs from a corresponding number of selected counters $2^0 - 2^{15}$, which inputs are representative of the time period for de-thermalizing the model airplane. The output of gate G12 is connected to one of the inputs of gate G13, a NAND gate.

A time period interruption device 21, which may be similar to device 20 described above, provides a low output when unenergized. The output of device 21 is connected to each of the inputs of gate G14, a NAND gate. The output of gate G14 is applied to one of the inputs to gate G13.

In operation, prior to lapse of the de-thermalizing time period, at least one of the inputs to gate G12 will be low. One or more low inputs to gate G12 partially enables the gate to provide a high output therefrom.

Device 21, generating all low inputs to gate G14 when unenergized, partially enables the gate to provide a high output therefrom. The two high inputs to gate G13 enables the gate and provides a low output. On completion of the de-thermalizing time period, all inputs to gate G12 will be high, enabling the gate and providing a low output therefrom. The low input from gate G12 and high input from gate G14 will partially enable gate G13 and provide a high output therefrom. Similarly, if device 21 is tripped prior to lapse of the de-thermalizing time period, its output will switch from low to high. A high input to gate G14 enables the gate to provide a low output therefrom. The low input from gate G14 and the high input from gate G12 partially enables gate G13 and provides a high output therefrom.

The output of gate G13 is connected to the base electrode of transistor T3. The emitter electrode of transistor T3 is connected to ground through a switch Ss' (which switch corresponds in function to switch Ss shown in FIG. 1). The collector electrode of transistor T3 is connnected in parallel with the collector electrode of transistor T2 to one pole of d.c. motor M'. The other pole of motor M' is connected to ground through a battery B'.

A low output from gate G13, such as would occur prior to completion of the de-thermalizing time, maintains transistor T2 in a non-conducting state. A high output from gate G13, as would occur on completion of the de-thermalizing time period or on energization of device 21, will cause transistor T3 to conduct and provide a current path through the motor M' and energize the motor. The energized motor M' will further withdraw the pin 34 from sleeve 43 as previously discussed. When lever 45 is freed, the button of switch Ss' is released and the switch opens. The open switch Ss' dissrupts the current path of motor M' and the latter will cease to rotate. In conclusion, the circuit as shown in FIG. 3, in combination with the square wave generator 60, the counters $2^0 - 2^{15}$ and the actuating mechanism, can be used to limit the engine run and de-thermalize a free flight model airplane.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. In a model airplane having an engine and a rotatable horizontal stabilizer and including means for selectively shutting off said engine and means for selectively rotating said stabilizer, wherein the improvement comprises:
   a. counting means for generating time based output pulses independent of a control signal;
   b. means for decoding said output pulses to produce at least one output signal after a predetermined lapse of time;
   c. an electric motor having an armature rotatably responsive to each one of said output signals;
   d. a pulley mounted upon said armature;
   e. first mechanical means for energizing said engine shut-off means; and
   f. second mechanical means for energizing said stabilizer rotating means; and
   g. line means disposed intermediate said pulley and said first and second mechanical means for serially actuating said first and second mechanical means in response to rotation of said armature; whereby, said engine and said horizontal stabilizer of said model airplane are shut off and rotated, respectively, in response to said output signals of said decoder.

2. The improvement as set forth in claim 1 wherein said first mechanical means includes a biased pivotal lever and said line means includes a pin in slidable engagement with said lever to retain said lever in a first of two positions.

3. The improvement as set forth in claim 2 including switch means responsive to the position of said lever, said switch means being in a first state when said lever is in said first position and in a second state when said lever is in said second position.

4. The improvement as set forth in claim 3 including electrically conducting means connecting said switch means in series with said electric motor for interrupting the rotation of said armature of said electric motor when said switch means is in said second state.

5. The improvement as set forth in claim 4 wherein said second mechanical means includes a further biased pivotal lever, said pin being in slidable engagement with said further lever to retain said further lever in a first of two positions.

6. The improvement as set forth in claim 5 including further switch means responsive to the position of said further lever, said switch means being in a first state when said further lever is in said first position and in a second state when said further lever is in said second position.

7. The improvement as set forth in claim 6 further including additional electrically conducting means connecting said further switch in series with said electric motor for interrupting the rotation of said armature of said electric motor when said further switch means is in said second state.

8. The improvement as set forth in claim 1 including:

a. a radio receiver responsive to a transmitted signal;

b. actuating means responsive to operation of said radio receiver for energizing said electric motor; whereby, operation of said electric motor is not solely dependent upon said output signals from said encoder.

* * * * *